Jan. 2, 1951  G. R. GRISSINGER  2,536,846
DOUGH DIVIDER

Filed Feb. 19, 1949  5 Sheets-Sheet 1

INVENTOR.
GLEN R. GRISSINGER
BY
Otto Moeller
Attorney

INVENTOR.
GLEN R. GRISSINGER
BY Otto Moeller
Attorney

Jan. 2, 1951 G. R. GRISSINGER 2,536,846
DOUGH DIVIDER
Filed Feb. 19, 1949 5 Sheets-Sheet 3

INVENTOR.
GLEN R. GRISSINGER
BY
Otto Moeller
Attorney

Jan. 2, 1951 G. R. GRISSINGER 2,536,846
DOUGH DIVIDER
Filed Feb. 19, 1949 5 Sheets-Sheet 4

INVENTOR.
GLEN R. GRISSINGER
BY
Otto Moeller
Attorney

Jan. 2, 1951   G. R. GRISSINGER   2,536,846
DOUGH DIVIDER

Filed Feb. 19, 1949   5 Sheets-Sheet 5

INVENTOR.
GLEN R. GRISSINGER
BY
Otto Moeller
Attorney

Patented Jan. 2, 1951

2,536,846

UNITED STATES PATENT OFFICE 2,536,846

DOUGH DIVIDER

Glen R. Grissinger, Long Beach, Calif., assignor to The Standard Stoker Company, Incorporated, a corporation of Delaware Application February 19, 1949, Serial No. 77,369

6 Claims. (Cl. 107—15)

This invention relates to machines for dividing and scaling plastic materials, and particularly for dividing and scaling dough into proper size for use in making rolls, buns, loaves of bread and the like.

Among the objects of the invention are the provisions of an improved divider which is so constructed to be conveniently assembled and disassembled for facilitating cleaning and repair of the machine; to provide for more accurate and uniform scaling than heretofore possible; and to render failure of the machine less likely.

The improved divider is generally of the type comprising a rotating disc provided with cylinders successively passing beneath a dough hopper. Each cylinder contains a piston arranged to be reciprocated by means of cam action including a stationary and an adjustable cam, whereby the stroke of the piston may be varied for scaling and dividing dough pieces of desired size. The piston is in retracted position when the cylinder is beneath the hopper to receive dough therefrom, and is in projected position after the cylinder passes the hopper to eject the divided dough piece from the cylinder. In dough receiving position, the cylinder is evacuated through grooves in the piston whereby the dough is drawn into the cylinder; and in dough ejecting position, pressure is introduced into the cylinder to clear the piston grooves of dough particles lodged therein.

In a divider of the type described, my invention provides an improved construction and arrangement of the vacuum port casing and the pressure port casing, improvements in the cam assembly and improvements in the piston assembly whereby the above objects are attained.

The invention accordingly comprises the elements and combinations of elements, features of construction, and arrangements of parts, hereinafter fully described and illustrated in the accompanying drawings.

While this machine is particularly designed for the purpose of dividing dough and it is hereinafter described with particular reference to dough, it will be obvious that it can also be used for dividing other plastic materials than dough.

Figure 1:
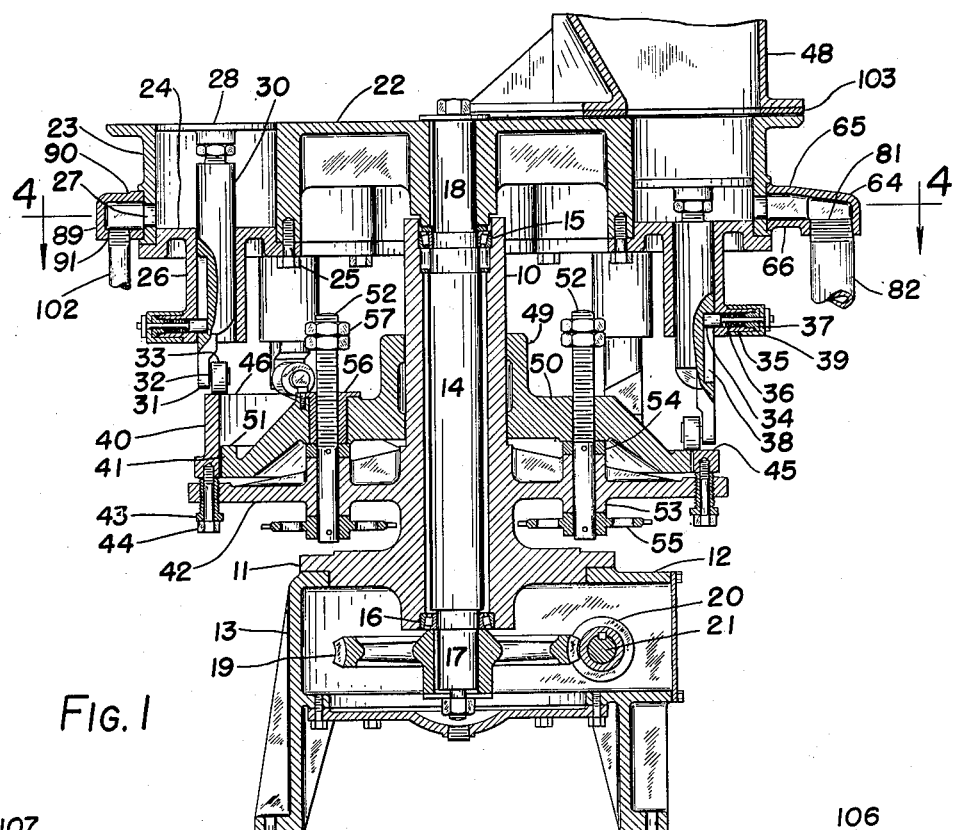
Figure 1 is a view in vertical central section of the divider with the supporting framework omitted.
Figure 5:
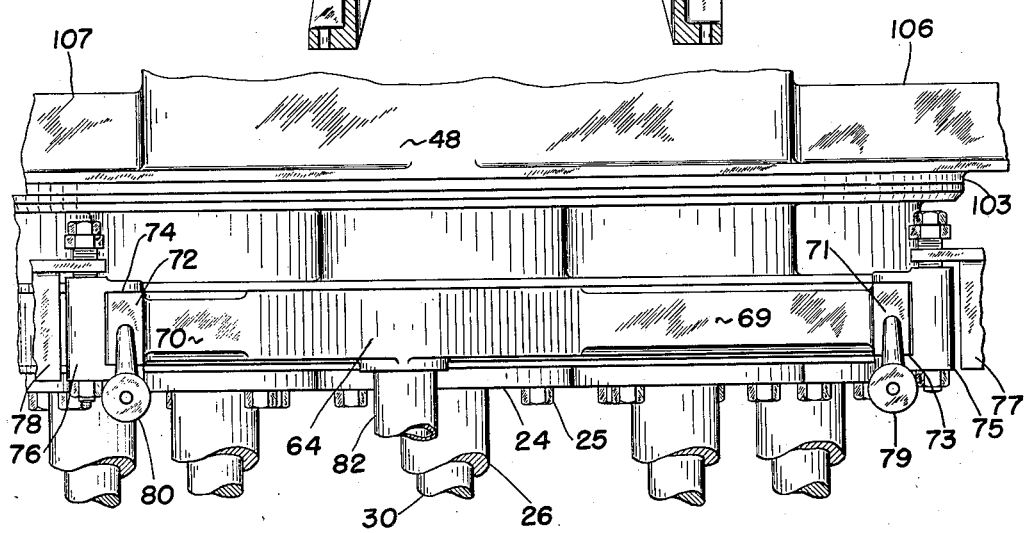
Figure 5 is a fragmentary view in side elevation of one side of the divider showing the vacuum port casing.

Referring to the drawings, particularly to Figure 1, the divider comprises a vertical drive shaft housing 10 provided at its lower end with an annular flange 11 which overlaps the marginal edges defining an opening in the top wall 12 of the gear housing 13. The drive shaft housing 10 is rigidly supported on the gear housing 13 by suitable means, as by bolts (not shown) extending through the flange 11 of the drive shaft housing 10 and the top wall 12 of the gear box 13.

A vertical drive shaft 14 extends through the drive shaft housing 10 and is mounted in the roller bearings 15 and 16 carried in the upper and lower ends, respectively, of the drive shaft housing 10. A lower shaft extension 17 of the drive shaft 14 projects beyond the lower end of the drive shaft housing 10 into the gear housing 13 and an upper shaft extension 18 of the drive shaft 14 projects beyond the upper end of the drive shaft housing 10.

Suitable gearing in the gear housing 13 is provided for transmitting rotary movement to the drive shaft 14, including a worm wheel 19 keyed to the lower shaft extension 17 and meshing with a worm 20 keyed to the horizontal shaft 21. The shaft 21 is driven through well known variable speed drive means (not shown) from a suitable motor (not shown).

Figure 2:
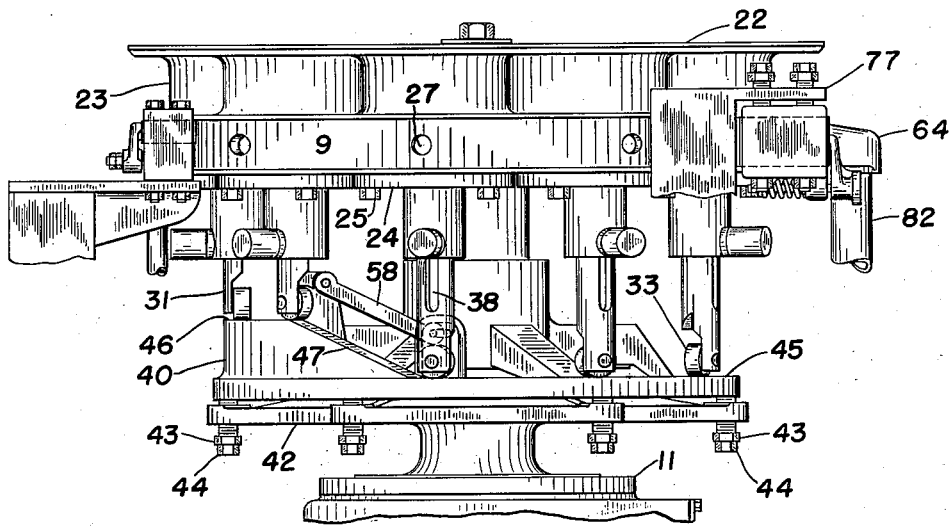
Figure 2 is a fragmentary view in side elevation of the divider with the hopper and stripper wheel removed.
Figure 4:
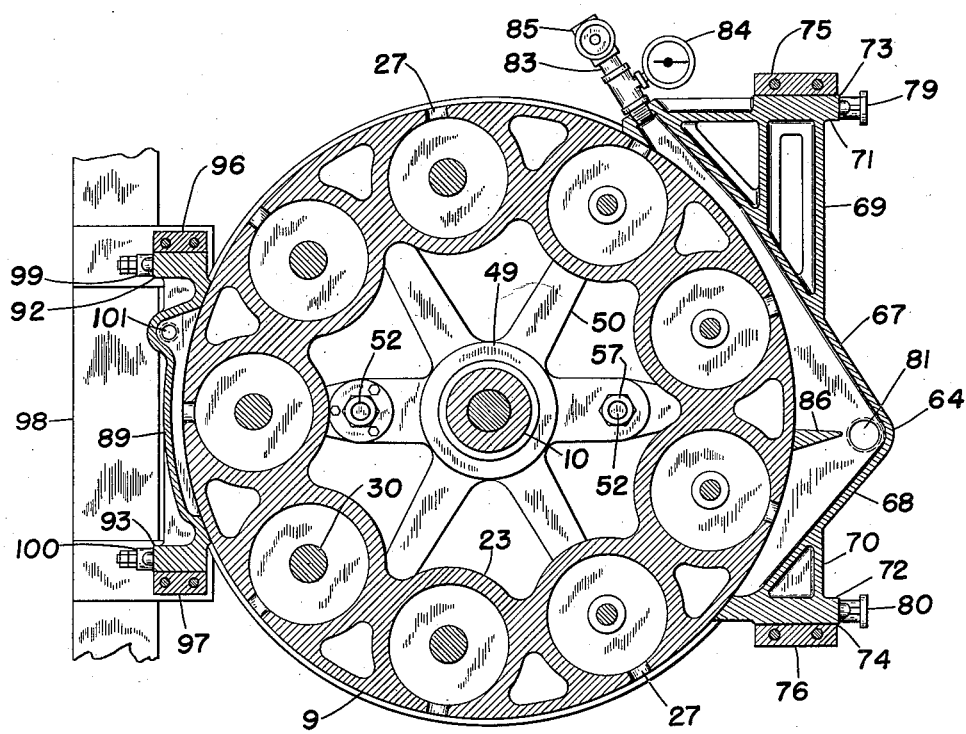
Figure 4 is a sectional view taken on the line 4—4 of Figure 1.
Figure 6:
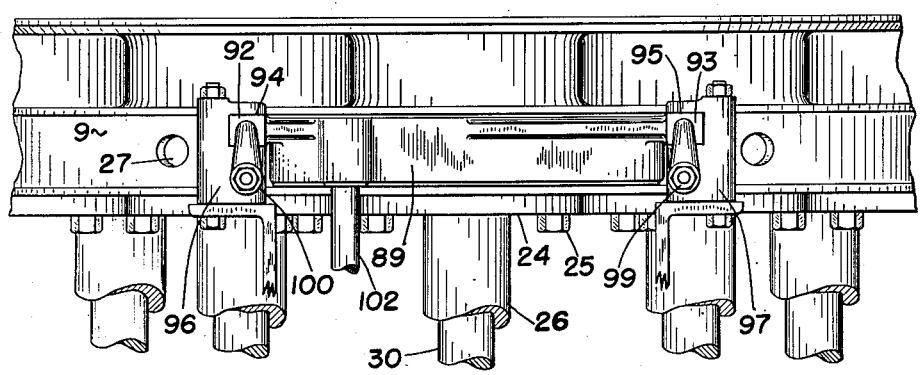
Figure 6 is a fragmentary view in side elevation of the opposite side of the divider from that shown in Figure 5, showing the pressure port casing.
Figure 10:
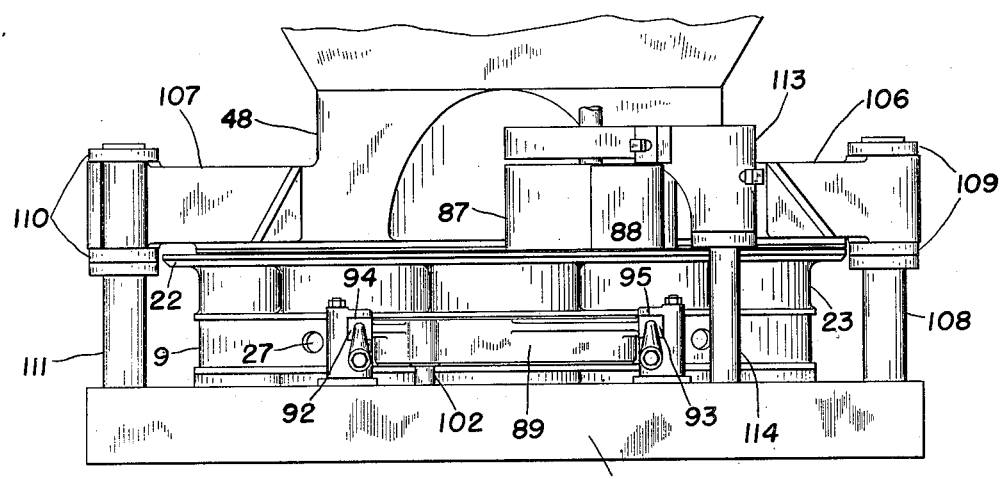
Figure 10 is a fragmentary side elevation of the divider showing the hopper and stripper wheel mounting.
Figure 11:
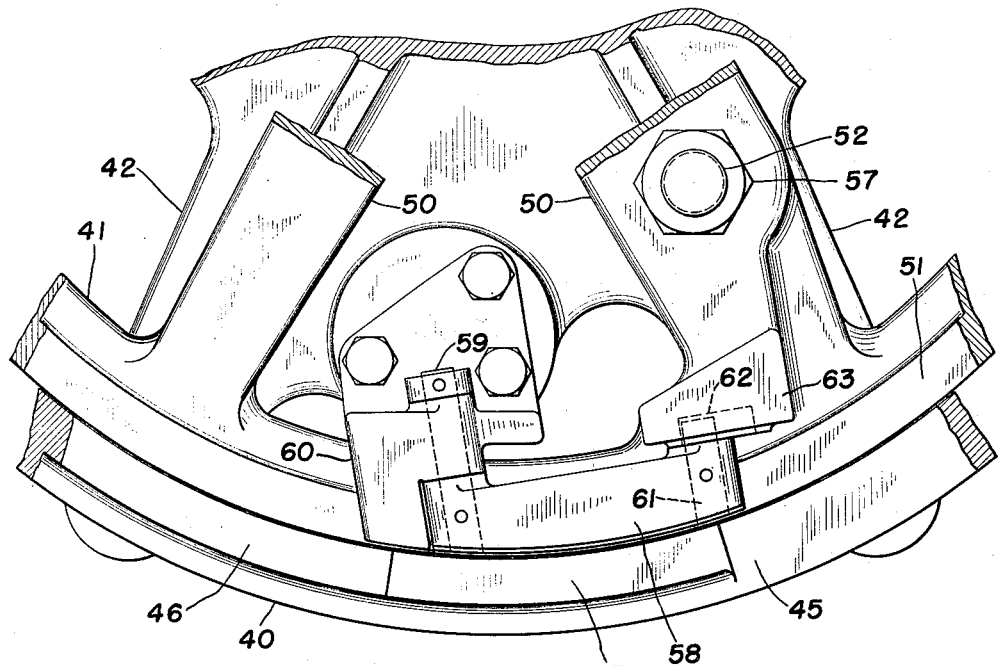
Figure 11 is an enlarged fragmentary plan view showing the mounting of the pull down mechanism.

Keyed on the upper shaft extension 18 of the drive shaft 14 for rotation therewith is a circular disc or cylinder plate 22. A plurality of equidistant circularly arranged cylinders 23, preferably formed integral with the plate 22, depend therefrom adjacent the periphery thereof. Preferably nine such cylinders are provided, as best shown in Figure 4. An annular channel-shaped race 9, as best shown in Figure 2, embraces and is integrally formed with the lower portions of the cylinders 23, the purpose of which will be brought out later in the description.

Again referring particularly to Figure 1, the bottom of each cylinder 23 is provided with a cylinder head 24 detachably secured to the cylinder in any suitable manner, as by bolts 25. Each of the cylinder heads 24 has an integrally formed and centrally disposed depending sleeve 26, opening at its upper end into the cylinder 23 and being also open at its lower end.

For a purpose to be later explained, each of the cylinders 23 is provided in its side wall immediately above the cylinder head 24 and remote from the axis of the plate 22 with a radial aperture 27 opening through the channel-shaped race 9.

Figure 9:
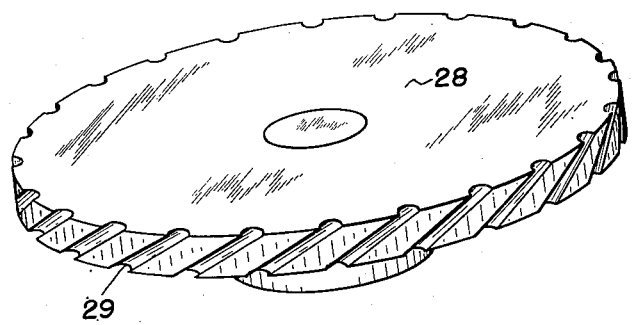
Figure 9 is an enlarged view in dimetric representation of the piston of the divider cylinder.

In each of the cylinders 23 there is mounted a piston 28 arranged, as hereinafter described, to reciprocate between an up position flush with the top of plate 22 and any one of a number of predetermined down positions within the cylinder 23 above the level of the aperture 27. The periphery of the piston 28 is provided with a plurality of equidistantly spaced angular grooves 29, preferably though not necessarily, oval in section, as best shown in Figure 9. The number, spacing and width of the grooves 29 may be varied, but should be so designed as to permit air to pass therethrough between the piston 28 and the wall of the cylinder 23 to produce a suction in the cylinder 23, as later explained, to draw the plastic material to be divided and scaled, such as dough, into the cylinder 23 but to retard passage of the said material through the grooves 29.

Reciprocating movement is communicated to the piston 28 through the piston rod 30 which is threaded at one end in the piston 28 and extends therefrom through the cylinder head 24 and sleeve 26, projecting beyond the lower end of the sleeve 26. The piston rod 30 is provided at its lower end with a reduced peripheral portion 31 having a radially inwardly extending stud 32 perpendicular with respect to the axis of the piston rod 30 and on the stud 32 is rotatably mounted a roller 33, all as best shown in Figures 1 and 2. This roller assembly is so constructed and arranged as not to protrude laterally beyond the circumference of the piston rod 30, whereby the piston assembly may be conveniently removed and replaced from the top of the plate 22 without disturbing or disassembling any other parts of the divider mechanism.

A latching arrangement is provided for preventing rotary movement of the piston rod 30, comprising a plunger 34 slidably mounted in a bored boss 35 extending laterally of the lower end of the sleeve 26. A spring 36 encircles a reduced portion of the plunger 34 between a spring retainer 37, threaded into the free end of the boss 35, and a shoulder formed by the enlarged portion of the plunger 34. The spring 36 forces the enlarged portion of the plunger 34 into a keyway 38 of the piston rod 30 preventing the latter from rotating while permitting reciprocating motion thereof. A cap 39 fits about the boss 35 and is secured in any suitable manner with the outer end of the plunger 34, whereby upon pulling the cap 39 outwardly, the enlarged end of plunger 34 is moved out of engagement with the key way 38 against the action of spring 36, thereby permitting removal or replacement of the piston assembly.

Reciprocation of the pistons 28 in the cylinders 23 as the cylinder plate 22 rotates is effected by a cam arrangement which will now be described. A ring-shaped cam 40, hereinafter referred to as the stationary cam to distinguish from an adjustable cam 41, is mounted concentric with the drive shaft 14 on a plurality of arms 42, preferably six in number, formed with and radiating from the drive shaft housing 10.

The outer end of each of the arms 42 has a sleeve 43 threaded therethrough on which the stationary cam 40 rests, providing for proper adjustment and alinement of the stationary cam 40. Suitable means, such as a cap screw 44 extends through each of the sleeves 43 and is threaded into the stationary cam 40 for securing it in position.

The top edge of the stationary cam 40 forms a track on which the rollers 33 of the piston assembly run as the cylinder plate 22 rotates. The contour of the cam 40 thus determines the extent of travel of the piston 28 in the cylinder 23. Cam 40 is provided with a lower track 45 extending for approximately 120° of the circumference thereof, and an upper track 46 with inclined tracks 47 connecting the lower and upper tracks 45 and 46. When the roller 33 of one of the piston assemblies is traveling along the upper track 46, its associated piston 28 is flush with the top of the cylinder plate 22, as shown at the left in Figure 1, and when the roller 33 of one of the piston assemblies is traveling along the lower track 45, its associated piston 28 is in its lowermost position, as shown at the right in Figure 1.

The hopper 48 for the dough or other plastic material to be divided and scaled is suspended over one side of the cylinder plate 22 above the lower track 45, and the depth of the piston 28 in the cylinder 23 and the cross sectional area of the cylinder 23 determine the amount of dough entering the cylinder 23 from the hopper 48. Provision is made for varying the size of the dough pieces that the device divides from the mass of dough, by adjustment of the depth of the stroke of the piston 28 in the cylinder 23. This is accomplished by means of the adjustable cam 41, previously referred to.

The adjustable cam 41 is in the form of a wheel fitting closely within the stationary cam 40, and is provided with a bored hub 49 embracing the drive shaft housing 10, and spokes 50, preferably six in number as shown in Figure 4, connecting the hub 49 with the circular track 51. Two diametrically opposite spokes 50 are designed to receive a pair of vertical adjusting screws 52 providing means for raising and lowering the adjustable cam 41 on the drive shaft housing 10. In Figure 1 the adjustable cam 41 is shown in its lowermost position. The adjusting screws 52 are supported in hubs 53 formed with a diametrically opposite pair drive shaft housing arms 42, and are secured against vertical movement by being pinned to thrust collars 54 on the top of hubs 53 and by being pinned to the roller chain sprockets 55 at the bottom of hubs 53. One of the adjusting screws 52 is threaded through one of the above mentioned pair of diametrically opposite spokes 50 and the other of the adjusting screws 52 is threaded through a bushing 56 which is suitably secured in the other of the above mentioned pair of diametrically opposite spokes 50.

As best shown in Figure 1, the rollers 33 overlap both the track 51 of the adjustable cam 41 and the tracks 45, 46, 47 of the stationary cam 40 so that they are adapted to run along either cam. Any suitable means is provided for turning the adjusting screws 52, as for example, a hand turned cranking mechanism (not shown) that operates a sprocket chain (not shown) trained about the sprockets 55, whereby the adjustable cam 41 may be raised to any one of a number of desired positions. Lock nuts 57 on the adjusting screws 52, form stops limiting the upward movement of the adjustable cam 41 so that the elevation of its track 51 does not exceed the elevation of the upper track 46 of the stationary cam 40. By raising the adjustable cam 41 so that its track 51 is above the level of the lower track 45 of the stationary cam 40, the depth of the stroke of the piston 28 in the cylinder 23 may be controlled to scale a piece of dough of desired size.

Figure 7:
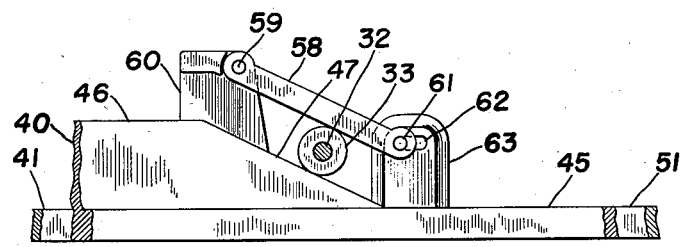
Figures 7 and 8 are enlarged fragmentary views in side elevation of the stationary and adjustable cams in different relative positions with the cam follower pull down mechanism applied thereto.
Figure 8:
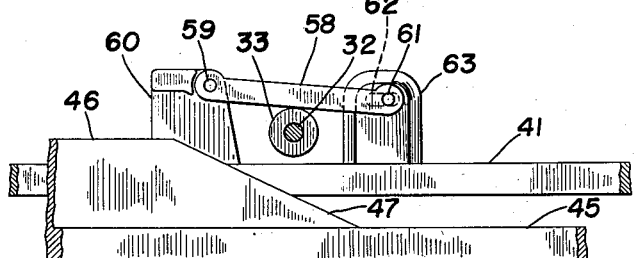

In order to insure positive downward movement of the piston assembly, novel and improved pull down mechanism is employed for urging the roller 33 from the upper track 46 of the stationary cam 40 down the inclined track 47 to the lower track 45 thereof, as shown in Figure 7, or from the upper track 46 of the stationary cam 40 to the track 51 of the adjustable cam 41, when the adjustable cam 41 is adjusted to an elevated position as shown in Figure 8.

The pull down mechanism is disposed above the inclined track 47 and includes a guide bar 58 pivotally mounted at one end on a fulcrum pin 59 carried by a bracket 60 which is secured to one of the drive shaft housing arms 42 adjacent the upper end of the inclined track 47. The other end of the guide bar 58 is provided with a pin 61 which is arranged to be received in a horizontal slot 62 formed in a lug 63 that is preferably formed integral with one of the adjustable cam spokes 50 adjacent the lower end of the inclined track 47.

The fulcrumed end of the guide bar 58 is thus at a constant elevation above the upper track 46 of the stationary cam 40 and the opposite end of the guide bar 58 is always at a constant elevation above the track 51 of the adjustable cam 41 irrespective of the position to which the adjustable cam 41 is adjusted. The piston assembly is thus positively pulled down by reason of engagement of the roller 33 against the under side of the guide bar 58, urging the roller 33 down from the upper track 46 of the stationary cam 40 to the track 51 of the adjustable cam 41.

As previously explained, the hopper 48 is suspended over one side of the cylinder plate 22 above the lower track 45 of the cam 40, so that as the cylinder plate 22 rotates, the cylinders 23 are brought beneath the hopper 48 with their pistons 28 in depressed position, or in other words in position to receive dough from the hopper 48. The dough is drawn into the cylinders 23 by evacuating the air from the space above the pistons 28 through the grooves 29 and from the space beneath the pistons 28 through the apertures 27.

The cylinder evacuating means includes a hollow vacuum port body 64 roughly triangular in horizontal cross section. One of the sides of the triangular vacuum port body 64 is open and the marginal edges of the top and bottom walls 65 and 66 of the body 64 defining the open side are curved on a radius corresponding to the radius of the race 9 and fit tightly thereagainst. The open side of the port body 64 is of a length to provide communication with preferably three of the cylinder apertures 27.

The side walls 67 and 68 of the triangular port body 64 are provided, respectively, with the laterally extending arms 69 and 70, formed at their outer ends, respectively, with guide members 71 and 72, adapted to be received, respectively, in guideways 73 and 74 of the guide support blocks 75 and 76, respectively. The guide support blocks 75 and 76 in turn are rigidly secured in any suitable manner to the brackets 77 and 78, secured to a suitable frame for the divider.

Spring clamps 79 and 80 carried by the guide support blocks 75 and 76, respectively, clamp over the guide members 71 and 72, respectively, holding the port body 64 against the race 9, and are designed to exert sufficient pressure to maintain a substantially air tight fit between the port body 64 and the race 9. It is evident that this construction and arrangement provides for convenient removal and replacement of the vacuum port body 64.

The bottom wall 66 of the vacuum port body 64 is provided adjacent the joining ends of the side walls 67 and 68 with an opening 81 connected by suitable tubing 82 with a source of vacuum (not shown). Connected with one end of the vacuum port body 64 is a pipe 83 provided with a vacuum gage 84 and a vacuum relief valve 85. Within the vacuum port body 64 is a baffle 86 joining the top and bottom walls 65 and 66 and extending from adjacent the opening 81 divergently to the open side of the vacuum port body 64. The baffle 86 serves to deflect any dough particles that are drawn through the piston grooves 29 toward the opening 81 for convenient removal from the vacuum port body 64. In order to further render the vacuum port body 64 self-cleaning air is admitted to the vacuum port body 64 through the vacuum relief valve 85.

Upon continued rotation of the cylinder plate 22 after one of its cylinders 23 passes from beneath the hopper 48, the cylinder piston 28 is raised until it is flush with the cylinder plate 22. Raising of the piston 28 is effected through travel of the roller 33 from the track 51 of the adjustable cam 41 up along one of the inclined tracks 47 onto the upper track 46 of the stationary cam 40. The divided and scaled dough piece which is thus ejected from the cylinder 23 is removed from the cylinder plate 22 in any suitable manner, as for example, by contacting the rotating stripper wheel 87, shown in Figure 3, which rotates in the same direction as the cylinder plate 22 and preferably at a higher R. P. M. Suitable means, not shown, is employed for rotating the stripper wheel 87. The stripper wheel 87 is supported over the cylinder plate 22 by a bracket 113 that is pivotally mounted on a post 114 suitably secured to the frame 98 of the divider, whereby the stripper wheel 87 may be swung clear of the cylinder plate 22 about the post 114 as an axis. A slight clearance is provided between the stripper wheel 87 and the surface of the cylinder plate 22. Rotation of the stripper wheel 87 carries the dough pieces around to a point where they are deflected onto a conveyor (not shown) by the stripper wheel scraper 88 carried by the bracket 113. The stripper wheel scraper 88 also serves to keep the surface of the stripper wheel 87 free from particles of dough.

In order to remove dough particles that may have become lodged in the piston grooves 29, means now to be described, is employed. This means includes a hollow pressure port body 89 somewhat similar to but smaller than the vacuum port body 64, disposed at the side of the cylinder plate 22 opposite the vacuum port body 64. One of the sides of the pressure port body 89 is open and the marginal edges of the top and bottom walls 90 and 91 defining the open side are curved on a radius corresponding to the radius of the race 9 and fit tightly thereagainst. The open side of the pressure port body 89 communicates with the cylinders 23 through the cylinder apertures 27. At its opposite ends, the pressure port body 89 is provided with guide members 92 and 93 adapted to be received, respectively, in guideways 94 and 95 of the guide support blocks 96 and 97, respectively. The guide support blocks 96 and 97 in turn are rigidly secured in any suitable manner to the frame 98 of the divider.

Spring clamps 99 and 100 carried by the guide support blocks 96 and 97, respectively, clamp over the guide members 92 and 93, respectively, holding the pressure port body 89 against the race 9, and are designed to exert sufficient pressure to maintain a substantially air tight fit between the port body 89 and the race 9. The pressure port body 89 is thus conveniently removable and replaceable.

The bottom wall 91 of the pressure port body 89 is provided at one end thereof with an opening 101 connected by suitable tubing 102 to the discharge side of the vacuum pump (not shown) that provides for evacuation of the vacuum port body 64. The air under pressure passes from the pressure port body 89 through the apertures 27 into the cylinders 23 beneath the piston 28 and eject the particles of dough that may have become lodged in the piston grooves 29.

Figure 3:
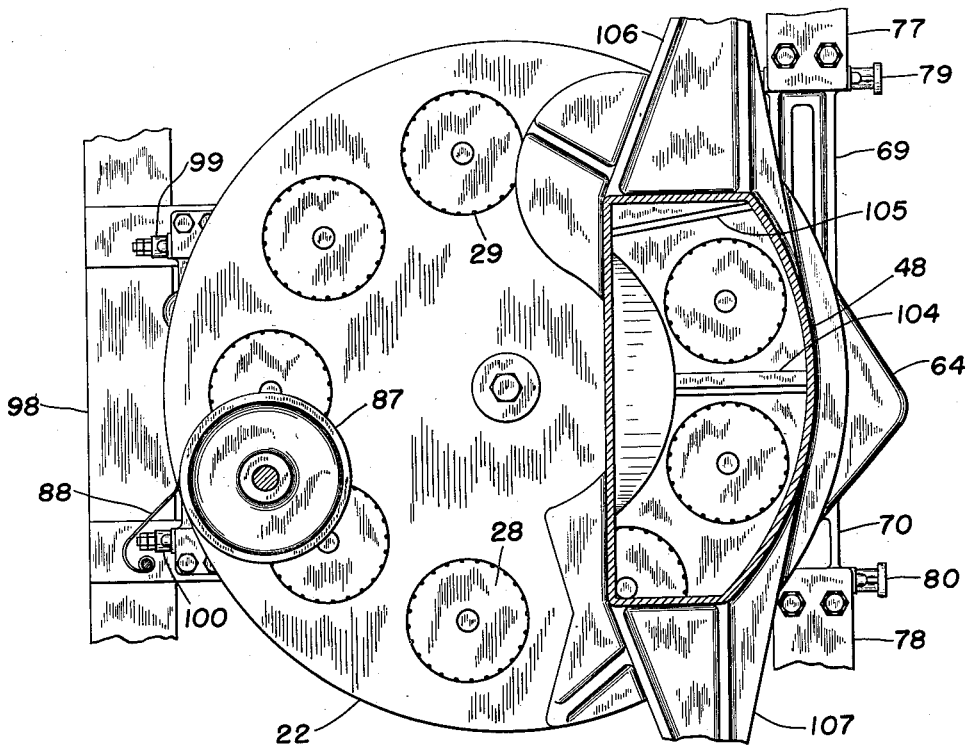
Figure 3 is a view in horizontal section through the divider hopper with the divider shown in plan, parts being broken away.

The hopper 48 converges to an arcuate shaped discharge opening of a width slightly exceeding the diameter of the cylinders 23 as may best be seen in Figure 3, to accommodate the travel pattern of the cylinders 23 as the cylinder plate 22 rotates. The base of the hopper 48 surrounding the discharge opening is provided with a wear plate 103 that clears the surface of the cylinder plate 22 a distance small enough to permit an oil seal to be formed between the surfaces of the cylinder plate 22 and wear plate 103. The oil seal prevents air from leaking into the cylinders 23 when they are under vacuum. The bottom of the hopper 48 is provided with a pair of knives 104 and 105 extending across the width of the discharge opening, which serve to cut off the dough that has been drawn into the cylinder 23 from the mass of dough in the hopper.

Extending laterally from the base of the hopper 48 are a pair of supporting arms 106 and 107. The arm 106 is pivotally mounted at its outer end on an upright post 108 between the adjusting collars 109 while the outer end of arm 107 is arranged to be removably received between the adjusting collars 110 fixed to an upright post 111, whereby the hopper 48 may be swung clear of the cylinder plate 22 about the upright post 108 as an axis.

I claim:

1. A dough divider comprising a stationary hopper, a horizontal disc carrying cylinders revolving under said hopper, a piston in each of said cylinders, a cam follower associated with each of said pistons, annular cam means upon which said cam followers travel for reciprocating said pistons, including a stationary high level track and a vertically adjustable low level track, and means for positively retracting said pistons including a guide above the adjacent ends of said high and low level tracks for engaging said cam followers, said guide having at one end a pivotal mounting in fixed relation with respect to said stationary track and a pivotal mounting at its opposite end movable with said adjustable track.

2. A dough divider comprising a stationary hopper, a rotating horizontal disc having a plurality of circumferentially arranged cylinders adapted to be brought successively beneath said hopper for receiving dough therefrom, a piston in each of said cylinders, means to reciprocate said pistons including cam followers, cam means upon which said cam followers travel, including a stationary annular track and a vertically adjustable annular track concentrically disposed within said stationary annular track, said stationary annular track having a high track section and an inclined track section leading from said high track section to said adjustable track, and means for positively retracting said pistons including a guide above said inclined track section for engaging said cam followers, said guide having at one end a pivotal mounting in fixed relation with respect to said stationary track and a pivotal mounting at its opposite end movable with said adjustable track.

3. A dough divider comprising a stationary hopper, a rotating horizontal disc having a plurality of circumferentially arranged cylinders adapted to be brought successively beneath said hopper for receiving dough therefrom, a piston in each of said cylinders, means to reciprocate said pistons including cam followers and cam means upon which said cam followers travel, said cam means including a stationary annular track formed with a low level section, a high level section and an inclined section connecting said high and low level sections, and an annular track concentrically disposed within said stationary annular track arranged for vertical adjustment to any one of a number of positions between the high and low level sections of said stationary annular track, and means for positively retracting said pistons including a guide above said annular tracks for engaging said cam followers, a pivotal support for one end of said guide in fixed relation with respect to said stationary track disposed adjacent the upper end of said inclined track section, and a pivotal support for the other end of said guide movable with said adjustable track disposed adjacent the lower end of said inclined track section.

4. A dough divider comprising a stationary hopper, a rotating horizontal disc having a plurality of circumferentially arranged cylinders adapted to be brought successively beneath said hopper for receiving dough therefrom, a piston in each of said cylinders, a cam follower associated with each of said pistons, annular cam means upon which said cam followers travel for reciprocating said pistons including a stationary high level track and a vertically adjustable low level track, and means for positively retracting said pistons including a guide above the adjacent ends of said high and low level tracks for engaging said cam followers, a guide support having a fixed relation with respect to said stationary track, a guide support having a fixed relation with respect to said adjustable track, said guide being pivotally mounted at its ends in said guide supports, and one of said pivotally mounted ends having a lost motion connection with its respective guide support.

5. In a dough divider of the type having a plurality of cylinders revolving in successive dough receiving relation with a hopper and including pistons reciprocating in the cylinders in response to cam followers for scaling and ejecting the dough; the combination of annular cam means along which said cam followers are adapted to travel for reciprocating said pistons including a high level track and a low level track, means for adjusting the relative heights of said tracks, and means adapted for positively retracting said pistons including a guide over the adjacent ends of said high and low level tracks for engaging said cam followers, said guide having at one end a pivotal mounting in fixed relation with one of said tracks and a pivotal mounting at its opposite end having a lost motion relation with the other of said tracks.

6. A dough divider comprising a plurality of revolving cylinders adapted for successive communication with a source of dough, a piston in each of said cylinders, a cam follower associated with each of said pistons, annular cam means along which said cam followers are adapted to travel for reciprocating said pistons including a raised and a depressed track, means for adjusting the relative outward extent of said tracks, and means for positively retracting said pistons including a guide over the adjacent ends of said tracks for engaging said cam followers, said guide having at one end a pivotal mounting in fixed relation with one of said tracks and a pivotal mounting at its opposite end movable with the other of said tracks.

GLEN R. GRISSINGER.

REFERENCES CITED

The following references are of record in the file of this patent:

UNITED STATES PATENTS

| Number | Name | Date |
| --- | --- | --- |
| 484,790 | Goerin | Oct. 25, 1892 |
| 692,903 | Rainbow | Feb. 11, 1902 |
| 938,051 | Gowdy | Oct. 26, 1909 |
| 1,278,517 | Streich | Sept. 10, 1918 |
| 1,331,130 | Streich | Feb. 17, 1920 |
| 1,966,147 | Steere | July 10, 1934 |
| 2,351,840 | Seem | June 20, 1944 |